United States Patent [19]
Ito et al.

[11] Patent Number: 5,627,933
[45] Date of Patent: May 6, 1997

[54] OPTICAL WAVEGUIDE AND PROCESS FOR PRODUCING IT

[75] Inventors: Masumi Ito; Maki Inai; Akira Inoue; Masakazu Shigehara, all of Yokohama, Japan

[73] Assignee: Sumitomo Electric Industries, Ltd., Osaka, Japan

[21] Appl. No.: 389,828

[22] Filed: Feb. 16, 1995

[30] Foreign Application Priority Data

Feb. 17, 1994 [JP] Japan .................................. 6-020487

[51] Int. Cl.⁶ .................................................. G02B 6/00
[52] U.S. Cl. ...................... 385/123; 385/141; 385/142; 385/144
[58] Field of Search ................................. 385/141–145, 385/123

[56] References Cited

U.S. PATENT DOCUMENTS 4,770,898  9/1988  Sugai et al. ........................ 427/54.1
4,820,018  4/1989  Melman et al. ..................... 350/96.33
4,915,717  4/1990  Watanabe et al. .................. 65/3.12

FOREIGN PATENT DOCUMENTS 8601303  2/1986  WIPO .
9400784  1/1994  WIPO .

*Primary Examiner*—John Ngo
*Attorney, Agent, or Firm*—Cushman Darby & Cushman, IP Group of Pillsbury Madison & Sutro, LLP

[57] ABSTRACT

This invention provides an optical waveguide having diffraction gratings with sufficiently high reflectivity, a waveguide member for obtaining the optical waveguide, and a production process thereof. An optical waveguide in which desired diffraction gratings are formed in a core and in a cladding at a predetermined portion by using a waveguide member in which germanium dioxide is added in the core and in the cladding and irradiating the predetermined portion of the waveguide member with interference fringes of ultraviolet light. By this, the optical waveguide according to the present invention reflects guided light throughout the entire mode field region, thus having a high reflectivity.

9 Claims, 5 Drawing Sheets

OPTICAL WAVEGUIDE AND PROCESS FOR PRODUCING IT

BACKGROUND OF THE INVENTION

1. Field of the Invention

The present invention relates to an optical waveguide such as an optical fiber, a thin-film waveguide, etc., and more particularly to a waveguide member for producing a diffraction grating in a predetermined portion while changing the index of refraction periodically, an optical waveguide in which the diffraction grating is built, and a process for producing it.

2. Related Background Art

There are a variety of forms in which a diffraction grating is built as a kind of optical component. When utilized for example in an optical communication system, particularly, a suitable one is of an optical waveguide type which is easy connect with another optical waveguide and in which the diffraction grating is built in order to lower an insertion loss.

A conventionally known process for producing the optical waveguide having the diffraction grating is for example one described in Japanese Laid-open Patent Application No. 62-500052. This is a method for producing the diffraction grating in such a manner that a quartz-base optical fiber is formed with a high-refractive-index core doped with germanium dioxide and that the optical fiber is then irradiated with strong ultraviolet light so as to produce a periodic index change in the core to form the diffraction grating.

SUMMARY OF THE INVENTION

For the optical waveguide with built-in diffraction grating, the reflectivity thereof is an important property, which depends upon the length of the diffraction grating (which is a length of a region where the refractive index is periodically changing in the core) and a photo-induced index change, as seen from the following formula (1).

$$R = \tan h2(L \cdot \pi \cdot \Delta n_{UV}/\lambda) \quad (1)$$

In this formula, R represents the reflectivity, L the length of the diffraction grating built in the core, $\Delta n_{UV}$ an index change due to ultraviolet light (photo-induced index change), and $\lambda$ a reflection wavelength.

It is known that the index change due to the irradiation of ultraviolet light is caused by glass defects related to germanium in glass. However, when an optical fiber for communication is used as it used to be, a cladding has a smaller number of glass defects. Then, an index change $\Delta n_{UV}$ of the cladding by the ultraviolet light is smaller than an index change $\Delta n_{UV}$ of the core. Thus, the whole of the optical waveguide cannot have a sufficient reflectivity.

Further, because with irradiation of the ultraviolet light the irradiated portion of the core (where the diffraction grating is built) has a higher index, a mode field diameter of this portion becomes smaller than that of the other portions of the core not irradiated with the ultraviolet light. With a change in the mode field diameter caused in the core, the light propagating in the core is radiated into the cladding because of mode mismatch, which increases a transmission loss.

Under the above circumstances, one of the objects of the present invention is to realize an optical waveguide having diffraction gratings with sufficient reflectivity and to provide a process for easily producing the optical waveguide.

An optical waveguide according to the present invention has a core as an optical waveguide portion, and a cladding having a lower refractive index than the core and covering the core in close fit, wherein an index change portion in which the refractive index periodically changes is formed as a diffraction grating in each of the core and the cladding at a predetermined portion. The number of the index change portion does not have to be limited to 1, but a plurality of index change portions may be formed at predetermined intervals along a propagation direction of light.

Particularly, for a waveguide member in which the diffraction grating is built both in the core and the cladding, an optical waveguide mainly consisting of a glass material with germanium dioxide being preliminarily added to either region, is utilized but this waveguide member includes a quartz glass waveguide containing quartz ($SiO_2$) as a main ingredient, and a multi-component glass waveguide consisting of a glass of a main ingredient of quartz and additives of $Na_2O$, CaO, etc. Also, in the specification, the optical waveguide means has a circuit or line for transmitting light while confining it in a certain region, utilizing an index difference between the core and the cladding, which includes the optical fiber, the thin-film waveguide, etc.

To function as an optical waveguide, the refractive index of the cladding needs to be lower than that of the core. The way to realize it is, for example, (1) a method to set the concentration of germanium dioxide added to the cladding to be lower than that added to the core; or (2) where the concentration of germanium dioxide added to the core is equal to or higher than that added to the cladding, an index reducer is further added. Here, as the index reducer, for example, boron oxide and fluorine are generally used.

Next, a process for producing the optical waveguide having the diffraction gratings according to the present invention is characterized in that the process comprises a step of preparing a glass waveguide member provided with a core doped with germanium dioxide, and a cladding doped with germanium dioxide and having a lower refractive index than the core, and a step of irradiating a predetermined portion (which is a region containing both the core and the cladding) of the glass waveguide member with ultraviolet light so as to change a refractive index of this predetermined portion.

In order to build the diffraction gratings in the predetermined portion of the waveguide member, interference fringes of the ultraviolet light need to be produced in the predetermined portion. An example of this method is such that two coherent light beams of the ultraviolet light are formed and that the two coherent ultraviolet light beams are projected at angles in a supplementary angle relationship with each other with respect to the optical axis of the core in the glass waveguide member, thereby producing the interference fringes. In another method, the ultraviolet light is projected to a phase grating and the phase grating transmits the ultraviolet light to form the interference fringes.

If the waveguide member has a plurality of integrated optical waveguide regions (cores), transmission of the ultraviolet light can be limited by utilizing a mask with a light transmission window and a selected optical system, whereby it can be applied to micromachining of diffraction grating.

Further, the production process can be applied to the cases where the waveguide member is moving, for example in a drawing step of optical fiber.

In the optical waveguide of the present invention, the diffraction grating is formed not only in the predetermined portion (index change portion) where the diffraction grating of the core is to be built, but also in the cladding covering the portion in close fit. Namely, reflected light is not only the guided light propagating in the core in the optical waveguide, but also the light radiated into the cladding out of the guided light while guided, so that the guided light is reflected throughout the entire mode field region. Therefore, the optical waveguide of the present invention has a high reflectivity.

Since the light radiated into the cladding out of the guided light leaks a little from the core into the cladding, a sufficiently high reflectivity is realized even if the index change portion in the cladding is present only near an interface between the core and the cladding.

On the other hand, in order to increase a change amount of refractive index, it is important to increase the glass defects as described above. To increase a dopant concentration of germanium dioxide in the core is effective, but in this case, if the change amount of refractive index before and after the irradiation of ultraviolet light in the UV-irradiated region of core becomes very large, another problem of transmission loss arises due to mode mismatch in regions in the same core.

In more detail, the UV-irradiated portion in the core has a higher refractive index to decrease the mode field diameter, while the other non-UV-irradiated portions do not have a change of the mode field diameter. If such a change of the made field diameter in the same core is caused, the guided light propagating in the core is likely to be radiated into the cladding, resulting in increasing the transmission loss.

In the optical waveguide having the diffraction gratings according to the present invention, germanium dioxide is added to each of the core and the cladding, and, therefore, the index change is caused in either region with irradiation of ultraviolet light. Thus, the optical waveguide has a structure that does not cause a substantial change of index difference between the core and the cladding. Accordingly, there is no periodic change of the mode field diameter caused in the propagation direction of light before and after the irradiation of ultraviolet light, thereby avoiding the above-described transmission loss due to the mode mismatch (i.e., the transmission loss caused by radiation of the guided light into the cladding).

Next, a process for producing the optical waveguide having the diffraction gratings according to the present invention comprises a step of preparing a glass waveguide member provided with a core doped with germanium dioxide and a cladding doped with germanium dioxide and having a lower refractive index than the core, and a step of irradiating a predetermined portion of the glass waveguide member (a region containing both the core and the cladding) with ultraviolet light so as to change a refractive index of this predetermined portion. It is also contemplated that this production process is applied to production processes of optical functional components of the optical waveguide type in which a plurality of integrated cores are formed as a waveguide member in which a diffraction grating is built, and production processes of optical fibers.

Here, the mechanism of changing the refractive index of glass with incidence of ultraviolet light is not perfectly clarified. However, an important cause is considered as oxygen-loss-type defects related to germanium in glass, assumed to be mono holes of neutral oxygen such as Si—Ge or Ge—Ge.

According to the Kramers-Kronig mechanism as suggested as a mechanism of the index changer the index change can be explained as follows. Namely, the above defects absorb ultraviolet light of wavelengths in the range of 240 to 250 nm. Then this absorption cuts Si—Ge or Ge—Ge coupling, which produces new defects. These new defects form an absorption band around the wavelength 210 nm and the wavelength 280 nm. As a result, the refractive index of glass changes according to the Kramers-Kronig relationship.

In the production process of the present invention, the optical waveguide with the core and the cladding both doped with germanium dioxide is prepared at the first step and the ultraviolet light is made incident into the optical waveguide, which changes the refractive index in the UV-entering portion both in the core and the cladding. Accordingly, the optical waveguide produced by the method of the present invention has a diffraction grating region in which a plurality of index change portions are aligned along the optical axis, not only in the core but also in the cladding.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
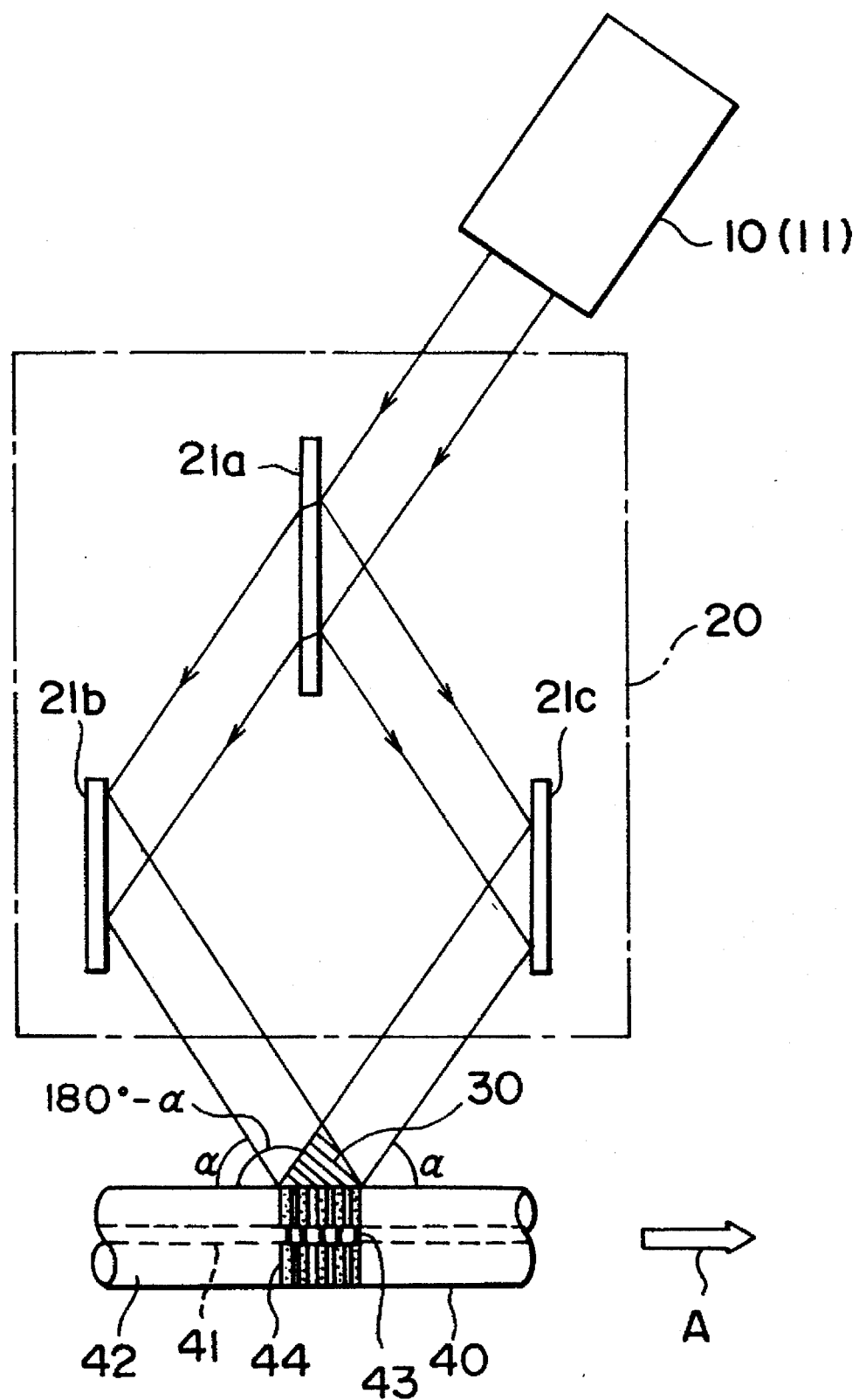
FIG. 1 is a drawing to illustrate an irradiation method of ultraviolet light and an optical waveguide obtained as an embodiment of the present invention.

The embodiments of the present invention will be described in detail with reference to the accompanying drawings. In the description of the drawings same elements will be denoted by same reference numerals, and redundant description will be omitted.

The first embodiment is now explained. In the present embodiment, a quartz-base optical fiber containing quartz ($SiO_2$) glass as a main ingredient is first prepared as a waveguide member used in forming a diffraction grating.

This optical fiber is provided with a core in which 20 wt % of germanium dioxide (GeO$_2$) is added to quartz glass, and a cladding in which 10 wt % of germanium dioxide and 20 wt % of boron oxide (B$_2$O$_3$) is added to quartz glass. Here, germanium dioxide is an additive for increasing the refractive index while boron oxide is an additive for decreasing the refractive index.

A relative index difference between the quartz glass doped with 20 wt % of germanium dioxide, and pure quartz glass is 1.5%, whereas a relative index difference between the quartz glass doped with 10 wt % of germanium dioxide and 20 wt % of boron oxide, and pure quartz glass is 0.5%.

It is noted that the optical fiber (waveguide member) in which the diffraction grating is to be built may be any one produced by any production process. For example, an optical fiber can be produced from an optical fiber preform produced by the well-known MCVD method, VAD method, OVD method, rod-in-tube method, etc., heating it in an electric furnace and drawing it.

For example, in the case of the VAD method, glass fine particles of SiO$_2$ and GeO$_2$ produced in flame are first deposited on a target of a rotating center rod, thereby forming a soot preform. Specifically, raw materials of silicon tetrachloride (SiCl$_4$) and germanium tetrachloride (GeCl$_4$), hydrogen as a fuel, and oxygen (all are gasses) are simultaneously fed to a burner for core. On the other hand, boron bromide (BBr$_3$) in addition to the above gasses are fed to a burner for cladding. Then the center rod is subjected to flames of the respective burners with combustion of hydrogen, thus forming the soot preform.

Next, the thus formed soot preform is perfectly dehydrated at high temperature to scatter impurities, and the temperature is further increased to sinter the preform. The preform (optical fiber preform) is thus completed, and an optical fiber can be obtained by fusing it at a further higher temperature in a drawing furnace and drawing it. A reference related to the above-described production process of optical fiber is for example U.S. Pat. Nos. 4,770,898 and 4,915,717.

Next, the thus produced optical fiber is subjected to irradiation with ultraviolet light, as described previously. Here, the irradiation with ultraviolet light may be effected on an optical fiber cut into a desired length or may be incorporated into a production process of optical fiber, for example, effecting it on the way of winding the optical fiber thus drawn.

In the present embodiment, the diffraction grating is formed at equal pitches in the optical fiber, and for this, the optical fiber is irradiated with ultraviolet light while forming interference fringes at equal intervals. The method of irradiation with ultraviolet light is next described in detail.

FIG. 1 is a drawing to illustrate the irradiation method. As shown in FIG. 1, the ultraviolet light emitted from an ultraviolet light source 10 is arranged to make interference by interference means 20 as a predetermined optical system and then is projected to an optical fiber 40 while forming interference fringes. This optical system may include a lens.

In the present embodiment, two coherent ultraviolet light beams are made to interfere with each other by the holographic interference method. In this method, the interference means 20 is composed of a beam splitter 21a and reflective mirrors 21b, 21c, as shown in FIG. 1. The ultraviolet light source 10 is an argon laser source 11.

The argon laser source 11 continuously emits the coherent ultraviolet light of 244 nm. This ultraviolet light is split into two beams of transmitted light and reflected light by the beam splitter 21a. The thus split beams are reflected by the respective, reflective mirrors 21b and 21c to be projected onto the optical fiber at respective angles of 74° ($\alpha$ in FIG. 1) and 106° (180°—$\alpha$ in FIG. 1) which are in the relation of complementary angles to each other with respect to the axial direction of core 41.

The split beams interfere with each other in an interference region 30 to be projected to the optical fiber 40 while forming interference fringes at predetermined intervals. The irradiation ultraviolet light is incident into the core 41 and the cladding 42 to change the refractive index in the incident portions.

Figure 2:
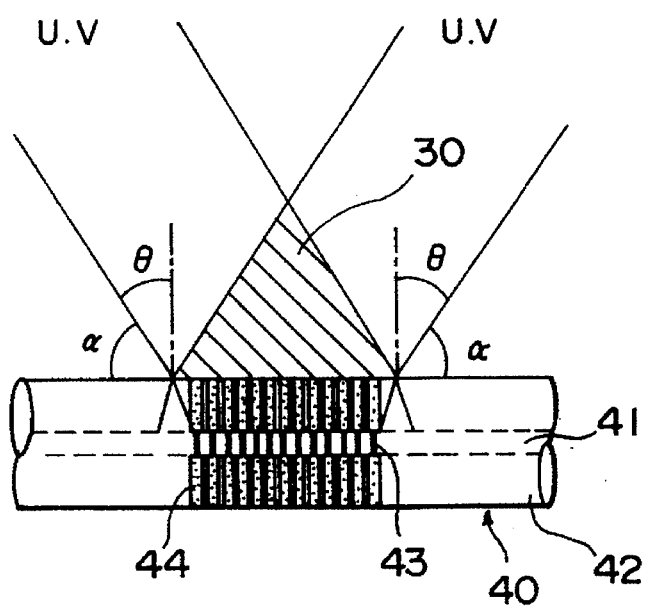
FIG. 2 is a drawing to show irradiation of ultraviolet light onto an optical fiber (waveguide member) by the holographic interference method as an irradiation method of ultraviolet light.

FIG. 2 is a drawing to show the irradiation of ultraviolet light onto the optical fiber 40. Using an angle of incidence $\theta$ (=90°—$\alpha$) of the ultraviolet light with respect to the radial direction of optical fiber 40 and the wavelength $\lambda$ of the ultraviolet light, the intervals $\Lambda$ of the interference fringes can be expressed as follows.

$$\Lambda = \lambda/(2 \sin \theta) \qquad (2)$$

Thus, in regions where the ultraviolet light is incident in the core 41 and the cladding 42, index-changed portions are aligned at a period corresponding to the intervals $\Lambda$ of the interference fringes along the optical axis of the optical fiber 40. Therefore, diffraction grating 43, 44 of pitches $\Lambda$ is formed in the core 41 or in the cladding 42, respectively. An optical fiber is thus obtained as an optical waveguide having the diffraction gratings in the core 41 and the cladding 42.

Using the refractive index n of core 41 and the pitch $\Lambda$ of the diffraction grating 43, the reflection wavelength $\lambda_R$ of this diffraction grating is expressed as follows by the well-known Bragg's diffraction condition.

$$\begin{aligned}\lambda_R &= 2n\Lambda \\ &= \lambda n/\sin\theta\end{aligned} \qquad (3)$$

In the present embodiment this reflection wavelength $\lambda_R$ is set at 1300 nm.

According to the above formula (3), because the refractive index of the cladding 42 is different from that of the core 41, the reflection wavelength of the diffraction grating 44 formed in the cladding 42 is shifted from 1300 nm. But the amount of the shift is not so great because the index difference is small. Since a reflection spectrum of the diffraction grating has a spread around the reflection wavelength, the diffraction grating 44 fully reflects the light of 1300 nm near the reflection wavelength.

During irradiation with ultraviolet light in the above production process, light from a LED light source is allowed to enter one end of the optical fiber and a transmission spectrum of the light is measured by a spectrum analyzer connected to the other end to monitor formation of the diffraction gratings in real time. Here, the spectrum analyzer detects a relation between the wavelength and the optical intensity for transmitted light through the diffraction gratings 43, 44.

With the start of the irradiation with ultraviolet light the formation of diffraction gratings 43, 44 proceeds so as to decrease the intensity of the transmitted light around the reflection wavelength in the transmission spectrum. When the transmission spectrum shows no further change, the formation of diffraction gratings 43, 44 is considered saturated and, therefore, the irradiation with ultraviolet light is stopped at this moment. In the present embodiment the saturation time is about 40 to 50 minutes.

The reflectivity for the reflection wavelength can be calculated from the transmission spectrum at the moment when the formation of diffraction gratings 43, 44 is saturated. According to this calculation, the reflectivity of the above optical fiber with the built-in diffraction gratings is about 75%, thus achieving a good result.

Although the above embodiment used the holographic interference method to form the interference fringes of ultraviolet light, the phase grating method can be applied instead thereof.

Figure 3:
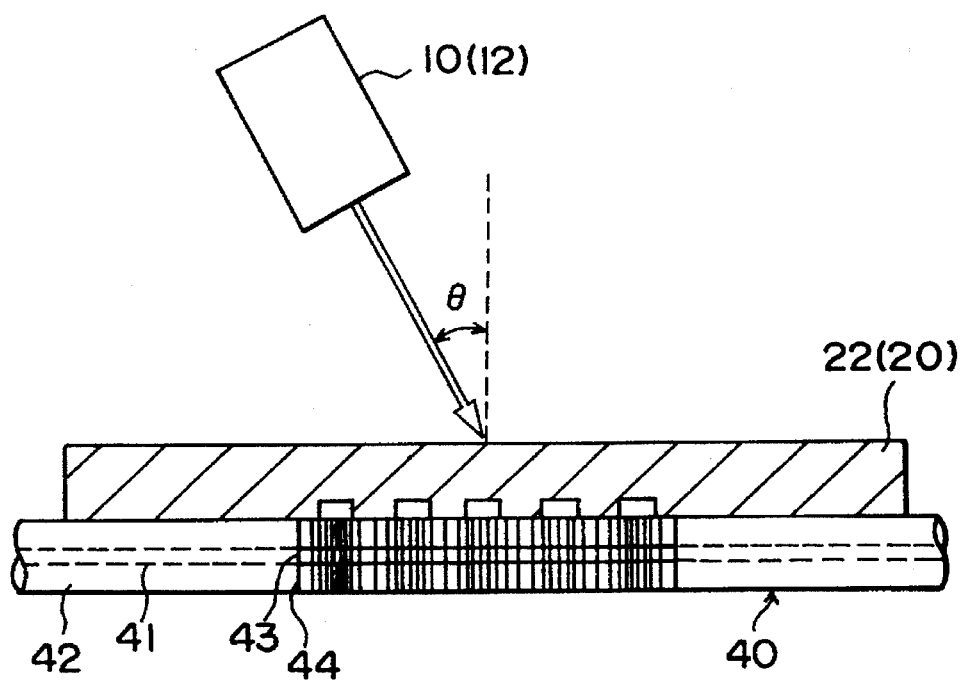
FIG. 3 is a drawing to show irradiation of ultraviolet light onto an optical fiber (waveguide member) by the phase grating method as an irradiation method of ultraviolet light.

FIG. 3 is a drawing to illustrate the phase grating method. First, a phase grating 22 as interference means 20 is secured in close fit to an optical fiber 40 as a waveguide member. A quartz plate with grooves formed at equal intervals can be used as the phase grating 22. Since the grooves in the phase grating 22 can be formed by photolithography and chemical etching, the grating intervals can be freely selected and the grating can be formed even in a complex shape.

Next, using, for example, a KrF excimer laser source 12 (ultraviolet light source 10) as a pulse light source and letting the light source output UV pulse light of wavelength 248 nm at a predetermined intensity and at a predetermined frequency, the phase grating is irradiated from the top for a predetermined time period in the manner as shown. The ultraviolet light may be emitted in a continuous manner.

When the ultraviolet light is transmitted by the phase grating 22, it forms interference fringes at predetermined intervals. The ultraviolet light is incident into the core 41 and the cladding 42 while forming the interference fringes. Then the periodic index changes, i.e., the diffraction gratings 43, 44 appear in the core 41 and the cladding 42, respectively. In this manner, an optical fiber is obtained as an optical waveguide in which the diffraction gratings are built both in the core 41 and the cladding 42.

Next, the second embodiment is described. In the present embodiment, prepared as an optical fiber in which the diffraction gratings are to be built is one provided with a core in which 20 wt % of germanium dioxide is added to quartz glass and a cladding in which 10 wt % of germanium dioxide and 10 wt % of fluorine (F) is added to quartz glass.

A relative index difference between the quartz glass in which 20 wt % of germanium dioxide is added, and pure quartz glass is 1.5%, whereas a relative index difference between the quartz glass in which 10 wt % of germanium dioxide and 10 wt % of fluorine is added, and pure quartz glass is 0.1%.

The diffraction gratings are written in this optical fiber in the same manner as in the first embodiment, thereby producing an optical fiber having diffraction gratings of reflection wavelength 1300 nm. Measuring the reflectivity in the same manner as in the first embodiment, the reflectivity was about 75% thus achieving a good result.

Further, the inventors produced an optical fiber as an optical waveguide in which the diffraction grating was written only in the core, for comparison with the first and the second embodiments. Prepared as an optical fiber of the waveguide member was one provided with a core in which 20 wt % of germanium dioxide was added to quartz glass and a cladding made of pure quartz glass. The relative index difference was 1.5%.

Using this optical fiber, an optical fiber was produced with the diffraction grating of reflection wavelength 1300 nm in the same manner as in the first and the second embodiments and the reflectivity was measured in the same manner in the embodiments. The measured reflectivity was about 50%, which was inferior to those in the embodiments.

It should be noted that the present invention is by no means limited to the above embodiments but may have various modifications. For example, the optical waveguide is not limited to optical fibers but may be thin-film waveguides. Also, the irradiation method of ultraviolet light may be selected from a variety of methods other than those in the above embodiments. For example, the diffraction gratings can be built in under irradiation of pulse light in the ultraviolet region while moving the optical waveguide along the direction of the optical axis as represented by arrow A in FIG. 1.

Figure 4:
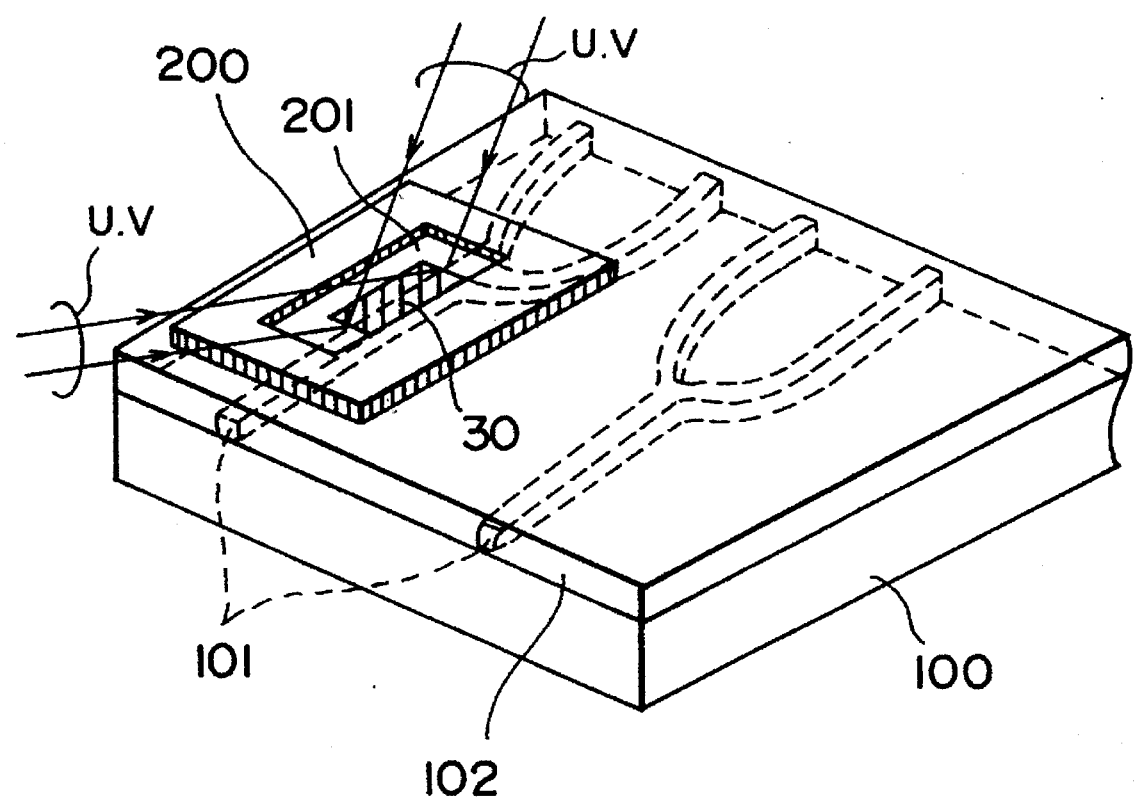
FIG. 4 is a drawing to show an embodiment to limit an irradiation region utilizing a mask, as an irradiation method of ultraviolet light.

In the case where the waveguide member has a plurality of integrated cores, as shown in FIG. 4, diffraction gratings may be built in predetermined portions of the waveguide member, utilizing a mask 200 provided between the interference means 20 and the waveguide member and having a window 201 of a predetermined shape so as to limit an irradiation region of ultraviolet light (UV). The waveguide member shown in FIG. 4 is an optical, functional component having an optical multiplexing/demultiplexing function, in which a plurality of cores 101 are shaped in the predetermined shape on a waveguide substrate 100 and the cores 101 are covered with the cladding 102.

Next, the third embodiment is described as to influence in the present invention, of the transmission loss due to the mode mismatch as described previously. In the present embodiment, prepared as an optical fiber in which the diffraction gratings are to be built is one provided with a core in which 40 wt % of germanium dioxide is added to quartz glass and a cladding in which 30 wt % of germanium dioxide and 20 wt % of boron oxide ($B_2O_3$) is added to quartz glass.

A relative index difference between the quartz glass in which 40 wt % of germanium dioxide is added, and pure quartz glass is 2.9%, while a relative index difference between the quartz glass in which 30 wt % of germanium dioxide and 20 wt % of boron oxide ($B_2O_3$) is added, and pure quartz glass is 2.0%. Further, this optical fiber is subjected to hydrogen treatment in order to enhance photoreactivity.

Diffraction gratings are written in this optical fiber in the same manner as in the first embodiment, and an optical fiber is produced with the diffraction gratings of reflection wavelength 1300 nm. The reflectivity was measured in the same manner as in the first embodiment, and the thus measured reflectivity was about 99.9%. The transmission loss was about 0.1 dB.

Further, the inventors prepared an optical fiber provided with a core in which 40 wt % of germanium dioxide was added and a cladding made of pure quartz glass, for comparison with this third embodiment. A relative index difference between the core in which 40 wt % of germanium dioxide is added, and the pure quartz glass was 2.9%.

Using this optical fiber, an optical fiber with the diffraction grating of reflection wavelength 1300 nm was produced in the same manner as in the first to third embodiments and the reflectivity was measured in the same manner as in the embodiments. The thus measured reflectivity was about 98% and the transmission loss was 0.4 dB. Thus, the obtained result showed an increase of the transmission loss as compared with the third embodiment. This increase of transmission loss is considered to be caused by radiation of the guided light propagating in the core into the cladding because of the mode mismatch as described previously.

Figure 5:
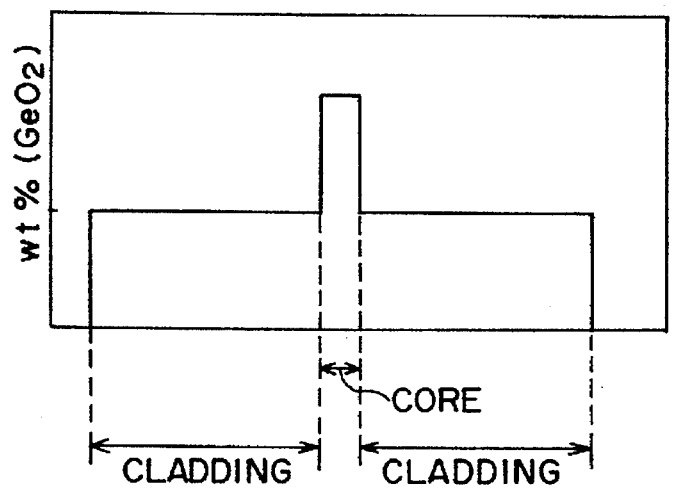
FIG. 5 is a drawing to show a dopant concentration of germanium dioxide as a first example of an impurity profile in the waveguide member.
Figure 6:
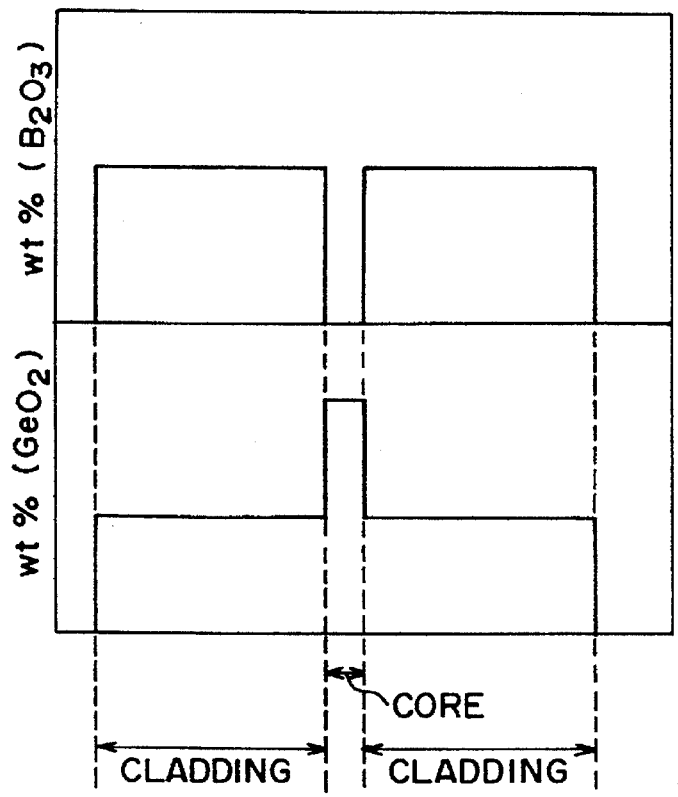
FIG. 6 is a drawing to show dopant concentrations of germanium dioxide and an index reducer (boron oxide), as a second example of impurity profiles in the waveguide member.
Figure 7:
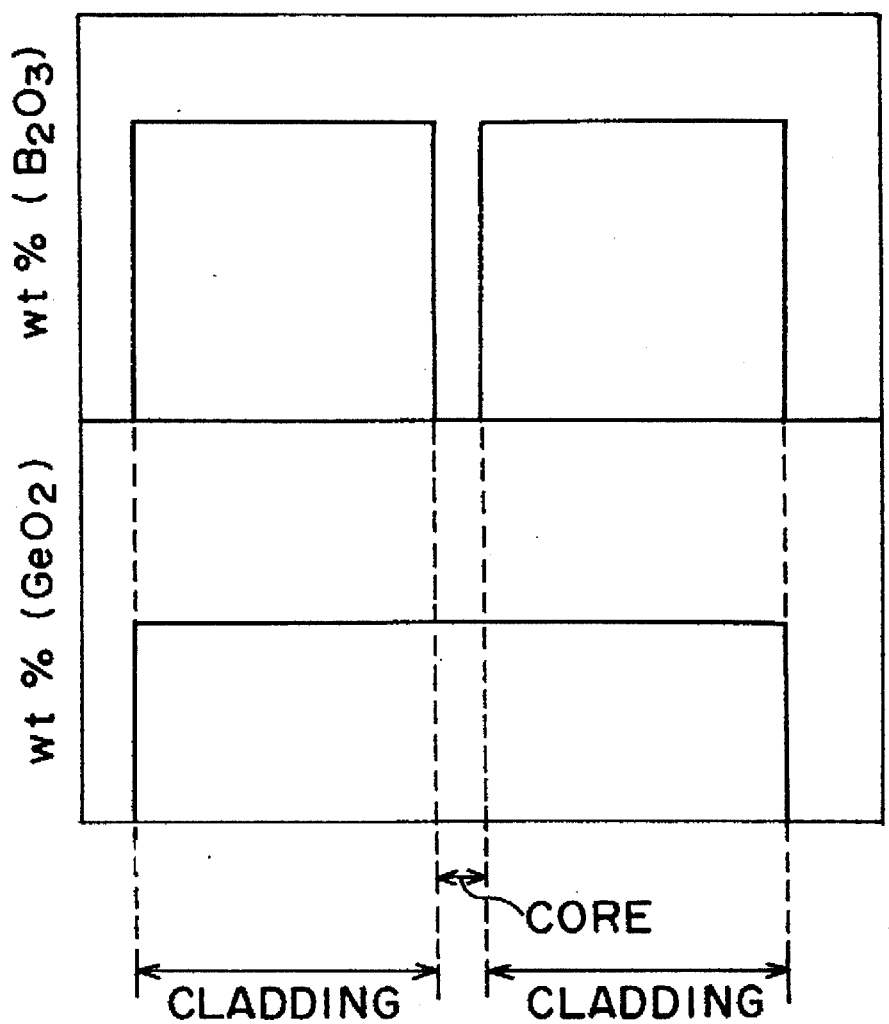
FIG. 7 is a drawing to show dopant concentrations of germanium dioxide and an index reducer (boron oxide), as a third example of impurity profiles in the waveguide member.

Next described referring to FIG. 5 to FIG. 7 are impurity profiles of the waveguide members according to the present invention.

In the waveguide members according to the present invention, germanium dioxide is added both in the core and the cladding. It is generally known that germanium dioxide is a material for increasing the refractive index in the core. Accordingly, in order to serve as an optical waveguide, the dopant concentration needs to be adjusted, for example, by setting the dopant concentration of germanium dioxide in the cladding to be lower than that in the core or by further adding an index reducer (for example, $B_2O_3$, F, etc.) for decreasing the refractive index into the cladding.

FIG. 5 shows a first example in which the dopant concentration of germanium dioxide in the core is set higher than that in the cladding. FIG. 6 shows a second example in which together with the concentration distribution of germanium dioxide as shown in FIG. 5, boron oxide as an index reducer is also added only in the cladding. Further, FIG. 7 shows a third example in which concentrations of germanium dioxide in the core and the cladding are set equal to each other and boron oxide as an index reducer is further added only in the cladding. In the present invention, the dopant concentration of each dopant is constant in each region of the core and the cladding.

As described above, according to the present invention, the diffraction gratings are formed both in the core and in the cladding, so that not only the guided light propagating in the core but also the light radiated into the cladding out of the guided light is reflected in the region where the diffraction gratings are formed, whereby the guided light is reflected throughout the entire mode field region. Accordingly, the optical waveguides having the diffraction gratings according to the present invention have high reflectivities.

In the production process of an optical waveguide having diffraction gratings according to the present invention, the ultraviolet light is allowed to enter predetermined portions of the waveguide member in which germanium dioxide is added both in the core and in the cladding, whereby the diffraction gratings are built both in the core and in the cladding in the resultant optical waveguide. Reflected in the region where the diffraction gratings are formed is not only the guided light propagating in the core but also the light radiated into the cladding out of the guided light, whereby the guided light is reflected throughout the entire mode field region. Thus, the optical waveguides of the present invention have higher reflectivities than those of the conventional optical waveguides. Accordingly, the optical waveguide type diffraction gratings can be easily produced with a sufficiently high reflectivity by the production process of the present invention.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 6-20487 (20487/1994) filed on Feb. 17, 1994 is hereby incorporated by reference.

What is claimed is:

1. A waveguide member comprising:
    a core having an optical waveguide region with a predetermined refractive index and doped with a predetermined concentration of germanium oxide; and
    a cladding having a lower refractive index than said core, the cladding being a region covering said core in a close fit and doped with a predetermined concentration of germanium dioxide, wherein said cladding is doped with an index reducer together with germanium dioxide.

2. A waveguide member according to claim 1, wherein said index reducer is at least one of boron oxide and fluorine.

3. A waveguide member according to claim 1, wherein the concentration of germanium dioxide added in said cladding is equal to that of germanium dioxide added in said core.

4. An optical waveguide comprising:
    a core as an optical waveguide region having a predetermined refractive index, said core having a diffraction grating formed in a predetermined portion thereof and having periodically changing refractive indices along a direction of propagation of light; and
    a cladding having a lower refractive index than said core and covering said core in a close fit, said cladding having a diffraction grating formed in a portion covering in a close fit said predetermined portion of the core where said diffraction grating of the core is formed and having periodically changing refractive indices along the direction of propagation of light.

5. An optical waveguide according to claim 4, wherein said core and said cladding each are quartz glass doped with germanium dioxide.

6. An optical waveguide according to claim 4, wherein said core is doped with a predetermined concentration of germanium dioxide and said cladding is doped with a lower concentration of germanium dioxide than that of said core.

7. An optical waveguide according to claim 4, wherein said core is doped with germanium dioxide and said cladding is doped with an index reducer together with said germanium dioxide.

8. An optical waveguide according to claim 7, wherein said index reducer is at least one of boron oxide and fluorine.

9. An optical waveguide according to claim 7, wherein the concentration of germanium dioxide added in said cladding is equal to that of germanium dioxide added in said core.

* * * * *